United States Patent
Uchishima

(10) Patent No.: US 8,295,237 B2
(45) Date of Patent: Oct. 23, 2012

(54) BASE STATION AND SCHEDULING METHOD THEREOF

(75) Inventor: Makoto Uchishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 382 days.

(21) Appl. No.: 12/562,488

(22) Filed: Sep. 18, 2009

(65) Prior Publication Data

US 2010/0040012 A1 Feb. 18, 2010

Related U.S. Application Data

(63) Continuation of application No. PCT/JP2007/056651, filed on Mar. 28, 2007.

(51) Int. Cl.
*H04W 4/00* (2009.01)
(52) U.S. Cl. .......................................... 370/329
(58) Field of Classification Search .......................... None
See application file for complete search history.

(56) References Cited

U.S. PATENT DOCUMENTS

2002/0115466 A1* 8/2002 Kanemoto et al. ............ 455/522
2005/0266799 A1* 12/2005 Hara et al. .................... 455/63.4

FOREIGN PATENT DOCUMENTS

| JP | 2005260634 | 9/2005 |
| JP | 2006345401 | 12/2006 |
| WO | 2006095387 | 9/2006 |

OTHER PUBLICATIONS

3rd Generation Partnership Project, "3rd Generation Partnership Project; Technical Specification Group Radio Access Network; Physical layer procedures (FDD) (Release 5)", 3GPP TS 25.214 V5.11.0, (Jun. 2005) p. 27-40.
Nokia, "HSDPA system performance with CL transmit diversity", 3GPP TSG RAN WG1 meeting #44bis, R1-060800 Mar. 2006.
International Search Report dated Jun. 26, 2007.

* cited by examiner

*Primary Examiner* — Anh-Vu Ly
*Assistant Examiner* — Maharishi Khirodhar
(74) *Attorney, Agent, or Firm* — Murphy & King, P.C.

(57) ABSTRACT

A scheduling method for a base station which transmits an identical packet or data to mobile stations via a plurality of transmission antennas based on a transmission diversity system is provided. In this scheduling method, a first transmission phase for each mobile station is monitored when a packet is diversity-transmitted to each of the mobile stations using a shared channel, and a second transmission phase for each mobile station is monitored when data is diversity-transmitted to each of other mobile stations using a dedicated channel. Then a degree of interference in all the dedicated channel mobile stations, which is generated when a packet is diversity-transmitted to a shared channel mobile station, is calculated using the first and second transmission phases for each shared channel mobile station, and a packet is transmitted preferentially to a shared channel mobile station whose degree of interference is the lowest.

12 Claims, 14 Drawing Sheets

FIG. 3

| MOBILE STATION ID | CALL TYPE | WEIGHT | |
|---|---|---|---|
| | | $W_1$ | $W_2$ |
| | | | |
| | | | |
| ⋮ | ⋮ | ⋮ | |

FIG. 4

| MOBILE STATION ID | CQI |
|---|---|
| | |
| | |
| ⋮ | ⋮ |

FIG. 5

| PACKET TRANSMISSION DESTINATION MOBILE STATION ID | TRANSMISSION PACKET AMOUNT $D_i$ | HOLDING START TIME | PACKET |
|---|---|---|---|
| | | | |
| | | | |
| ⋮ | ⋮ | ⋮ | ⋮ |

BASE STATION AND SCHEDULING METHOD THEREOF

CROSS REFERENCE TO RELATED APPLICATION

This application is a continuation of PCT application of PCT/JP2007/056651, which was filed on Mar. 28, 2007.

BACKGROUND OF THE INVENTION

The present invention relates to a base station and a scheduling method thereof, and more particularly to a base station which transmits an identical packet or data to mobile stations using a plurality of transmission antennas based on a transmission diversity system, and a scheduling method thereof.

The transmission diversity technology (Tx-Div technology) is a downlink communication technology from a base station to terminals (mobile stations) in a WCDMA system, and is used to decrease reception interference in mobile stations. According to this transmission diversity technology an identical packet or data is transmitted to mobile stations via a plurality of transmission antennas. HSDPA (High Speed Downlink Packet Access) technology is a high speed communication method to transmit packets from a base station of a WCDMA system to mobile stations.

(1) Transmission Diversity

Closed Loop Transmission Diversity System

FIG. 13 is a diagram depicting a closed loop transmission diversity system among transmission diversity technologies. In a closed loop transmission diversity system, a plurality of antenna elements are disposed in a wireless base station in a cellular mobile communication system, and (1) a different amplitude and phase control is performed for an identical transmission data signal based on feedback information FBI which is sent from a mobile station, thereby transmission data is generated for each antenna element, (2) a pilot signal is multiplexed with each transmission data which is obtained by the different amplitude and phase control, and multiplexed results are transmitted via a plurality of antennas, and (3) the mobile station side receives the transmission data, and decides the feedback information that instructs amplitude and phase control amount using the downlink pilot signal, multiplexes this feedback information with an uplink channel signal, and transmits it to the base station side, and the above operation is repeated hereafter.

In the case of the closed loop transmission diversity in W-CDMA, that is the third generation mobile communication system, a system using two transmission antennas, shown in FIG. 13, is adopted. In FIG. 13, pilot patterns $P_1$ and $P_2$, which are orthogonal to each other, are generated in a pilot signal generation unit 11, are combined with transmission data in combining units $CB_1$ and $CB_2$, and are transmitted via transmission antennas 10-1 and 10-2 respectively. A channel estimation unit (not illustrated) at the reception side of the mobile station computes the correlation of the received pilot signal and the known pilot pattern, so as to estimate the channel impulse response vectors $h_1$ and $h_2$ from each transmission antenna 10-1 and 10-2 of the base station to the mobile station reception antenna 12.

A weight calculation unit 13 calculates an amplitude and phase control vector (referred to as weight vector) $w=[w_1, w_2]^T$ of each transmission antenna 10-1 and 10-2 of the base station, so that the power P given by the following Expression (1) becomes the maximum, using these channel estimation values $h_1$ and $h_2$. Then this weight vector is quantized and multiplexed with the uplink channel signal as the feedback information, and is transmitted to the base station. It is not necessary to transmit both values $w_1$ and $w_2$, but is sufficient to transmit only value $w_2$, which is determined with $w_1=1$.

$$P=w^H H^H w \quad (1)$$

$$H=[h1, h2] \quad (2)$$

Here h1 and h2 are channel impulse response vectors from the antenna 10-1 and antenna 10-2 to the mobile station reception antenna 12 respectively. The $H^H$ and $w^H$ denotes the Hermite conjugates of the matrices H and w.

In a mobile station, the weight coefficient unit 13 calculates the weight factor (weight vector), as mentioned above, and a multiplexing unit 18 multiplexes this weight factor with the uplink transmission data as the feedback information FBI, and sends it to the base station via a transmission antenna 14.

In the base station, the feedback information from the mobile station is received via a reception antenna 15, a feedback information extraction unit 16 extracts the weight factors $w_1$ and $w_2$, which are control amounts, and an amplitude/phase control unit 17 multiplies the downlink transmission data by the weight factors $w_1$ and $w_2$ respectively using multiplexers $MP_1$ and $MP_2$, so as to control the amplitude and phase of the signals to be transmitted via the transmission antennas 10-1 and 10-2. Thereby the mobile station can efficiently receive the signals which are transmitted from the two diversity transmission antennas 10-1 and 10-2. Ideally it is preferable that the signals, which are transmitted from the two diversity transmission antennas 10-1 and 10-2, reach and are received by the reception antennas 12 in a state of having a same phase.

Feedback Information FBI

In W-CDMA, two methods, that is mode 1 which quantizes the weight factor $w_2$ into 1 bit, and mode 2 which quantizes the weight factor $w_2$ into 4 bits, are specified. Mode 1 is a method for controlling the phase of a reception signal from each transmission antenna to be roughly a same phase with a π/4 resolution, where 1-bit feedback information is transmitted via each slot, and controlled. Mode 2 is a method for controlling the phase of a reception signal from each transmission antenna to be roughly a same phase with a π/4 resolution, and also controls the ratio of transmission power of the transmission signal from each transmission antenna using 4-bit information.

FIG. 14 is a diagram depicting the configuration of an uplink DPCH (Dedicated Physical Channel)frame, standardized according to the $3^{rd}$ Generation Partnership Physical projects (hereinafter referred to as 3GPP), where DPDCH (Dedicated Physical Data Channel) over which only transmission data is sent, and DPCCH (Dedicated Physical Control Channel) over which such control data as pilot and feedback information is sent, are multiplexed by orthogonal codes. In a frame format of an uplink signal from the mobile station to the base station, one frame is 10 msec., and consists of 15 slots (slot #0 to slot #14). DPDCH is mapped on an orthogonal I channel in QPSK modulation, and DPCCH is mapped on an orthogonal Q channel in QPSK modulation. Each slot of DPDCH consists of n (=N data) bits, and n changes according to the symbol speed. Each slot of DPCCH consists of 10 bits, the symbol speed is constant at 15 ksps, and transmits pilot PILOT, transmission power control data TPC, transport format combination indicator TFCI, and feedback information FBI. PILOT is used by the reception side for channel estimation (estimating propagation path characteristics) and measuring Signal to Interface Ratio (SIR), TPC is used for transmission power control, and TFCI is used for transmitting a symbol speed of data and the number of bits per frame, or the like, and FBI are used for transmitting the above mentioned feedback information (weight factor) for controlling the transmission diversity in the base station.

Based on the transmission power control bit TPC, the base station controls transmission power to the mobile station, so that the reception Signal to Interface Ratio (SIR) of the mobile station becomes constant.

Configuration of Wireless Mobile Station

FIG. 15 is a configuration example of the wireless mobile station, where a downlink data signal from the base station is received by the reception antenna 12, divided into data and pilot, and sent to a data channel inverse spread unit 20 and a pilot channel inverse spread unit 22 respectively. The data channel is inverse-spread in the data channel inverse-diffusion unit 20, and the pilot channel is inverse-spread in the pilot channel inverse-spread unit 22. The pilot signals $P_1'$ and $P_2'$ which are processing results of the pilot channel inverse spread unit 22, are input to channel estimation units 23-1 and 23-2 and the weight calculation unit 13.

The channel estimation units 23-1 and 23-2 compares the received pilot signals $P_1'$ and $P_2'$ and the known pilot signals $P_1$ and $P_2$ in order to determine each channel estimation value from the transmission antennas 10-1 and 10-2 of the base station to the reception antenna 12. Then the channel estimation units 23-1 and 23-2 estimates the channel impulse responses $h_1$ and $h_2$ and input the responses to a reception unit 21. The reception unit 21 performs channel compensation processing on the data channel signals based on the channel impulse responses, and inputs the result to the demodulation and decoding units, which are not illustrated.

The weight calculation unit 13 determines the weight factors $w_1$ and $w_2$ which maximize the power P given by Expression (1), and outputs the feedback information FBI. In other words, an phase/amplitude comparison unit 13a of the weight calculation unit 13 compares the phases and amplitudes of the pilot signals $P_1'$ and $P_2'$ received from the transmission antennas 10-1 to 10-2, and outputs the weight factors $w_1$ and $w_2$, an FBI generation unit 13b generates a feedback FBI corresponding to these weight factors $w_1$ and $w_2$, and inputs them to the multiplexing unit 18, and the multiplexing unit 18 multiplexes the feedback information and the transmission data signal. A data modulation unit 25 performs orthogonal modulation based on the multiplexed data, a spread modulation unit 26 spread and modulates the data, and transmits the uplink data, including the feedback information from the transmission antenna 14, to the base station.

(2) HSDPA

HSDPA is a high-speed packet communication technology. As FIG. 16 shows, the main wireless channels used for HSDPA are (1) HS-SCCH (High Speed Shared Control Channel), (2) HS-PDSCH (High Speed Physical Downlink Shared Channel), and (3) HS-DPCCH (High Speed Dedicated Physical Control Channel).

Both HS-SCCH and HS-PDSCH are downlink shared channels, of which HS-SCCH is a control channel used to send various parameters on packets which are transmitted via HS-PDSCH.

In other words, HS-SCCH is a channel to notify the mobile station that packets are transmitted via HS-PDSCH. The various parameters include, for example, destination information of a mobile station to which the packet is sent, modulation system information as to which modulation system is used for transmitting the packet via HS-PDSCH, and information on the pattern of rate matching to be performed on the transmission data.

HS-DPCCH, on the other hand, is an uplink dedicated control channel, and is used for transmitting an ACK signal/ NACK signal to indicate the presence of an error in the data which the mobile stations 71 and 72 received via HS-PDSCH respectively, and CQI (Channel Quality Indicator) to indicate the reception quality, to the wireless base station. The wireless base station performs retransmission control H-ARQ (Hybrid Automatic Repeat reQuest) based on the ACK signal/ NACK signal. In addition, the wireless base station judges the quality of the downlink wireless environment by CQI and switches to a modulation system with which packets are transmitted faster if the environment is good, or switches to a modulation system with which packets can be transmitted slower if not (in other words, adaptive modulation is performed).

Problem the Invention is to Solve

When identical packets are transmitted on a shared channel using HSDPA, via a plurality of transmission antennas based on the transmission diversity system, a problem is that interference to a mobile station which is not using HSDPA, such as a mobile station communicating voice and images via a dedicated channel DPCH, may increase depending on the scheduling of HSDPA.

This is because in HSDPA, a plurality of mobile stations share a channel, and packets are transmitted at high power. In particular, the interference of HSDPA on voice communication increases and communication quality thereof deteriorates if a transmission phase which generates at a time when packets are diversity-transmitted to mobile stations using a shared channel based on HSDPA, accords with a transmission phase which generates at a time when voice data is diversity-transmitted to mobile stations using a dedicated channel.

To prevent this, a scheduler determines a shared channel is allocated to which mobile station, and how long the channel is allocated to the mobile station, considering (1) the environment of each mobile station, and (2) the time the data destined for each mobile station stays in the base station. However, a problem is that current scheduling system is insufficient, and interference of HSDPA on non-HSDPA communication, such as voice communication, is considerable.

A first prior art is a technology for rotating the phase of the transmission diversity antennas based on the FBI information from the mobile stations under HSDPA using transmission diversity (JP2005-260634A). However, this first prior art does not decrease the interference of HSDPA on non-HSDPA communication.

A second prior art is a wireless data transmission system for transmitting data to predetermined mobile terminals from the network side via a shared wireless line (WO2006/ 095387). In this second prior art, the scheduler calculates an index value to select a mobile terminal based on the quality of a receive signal in each mobile terminal, corrects this index value using a quality fluctuation rate of the reception signal, or a fading frequency or error rate for each CQI, for example, and selects a mobile terminal to which data is transmitted via the shared wireless line, based on this corrected index value. However this second prior art does not decrease the interference of HSDPA on non-HSDPA communication either.

SUMMARY OF THE INVENTION

With the foregoing in view, it is an object of the present invention to decrease interference of HSDPA on non-HSDPA communication, such as dedicated channel communication (voice and image communication).

Scheduling Method for Base Station

A first aspect of the present invention is a scheduling method for a base station which transmits an identical packet or data to mobile stations via a plurality of transmission antennas based on a transmission diversity system, the method having: a step of monitoring a transmission phase (first transmission phase) for each mobile station when a packet is diversity-transmitted to mobile stations using a shared channel, and monitoring a transmission phase(second transmission phase) for each mobile station when data is diversity-transmitted to other mobile stations using a dedicated channel, a step of calculating, by making use of the first and second transmission phases for each shared mobile station to which a pilot is diversity-transmitted using the shared channel, a degree of interference in all dedicated channel mobile stations to which data is diversity-transmitted using the dedicated channel, the interference being generated when a packet is diversity-transmitted to the shared channel mobile station, and a step of transmitting a packet to a predetermined shared channel mobile station preferentially, according to this degree of interference.

In the scheduling method, the second step, includes substeps of determining a number of dedicated channel mobile stations to which data is diversity-transmitted in a same transmission phase as the transmission phase of a shared channel mobile station, for each shared channel mobile station, and regarding the number of the dedicated channel mobile stations as the degree of interference.

In the scheduling method, the second step includes substeps of, for each shared channel mobile station, finding the dedicated channel mobile stations to which data is diversity-transmitted in a same transmission phase as the transmission phase of a shared channel mobile station, computing a sum of transmission powers for these dedicated channel mobile stations and regarding this sum of transmission powers as the degree of interference.

In the scheduling method, the second step includes substeps of, increasing, a weight as a phase difference between a transmission phase of a shared channel mobile station and a transmission phase of a dedicated channel mobile station to which data is diversity-transmitted becomes smaller, and finding the weights for all the dedicated channel mobile stations to which data is diversity-transmitted based on the phase differences for each shared channel mobile station, and regarding the sum of the weights as the degree of interference.

In the scheduling method, the second step, includes substeps of increasing a weight of transmission power as a phase difference between a transmission phase of a shared channel mobile station and a transmission phase of a dedicated channel mobile station to which data is diversity-transmitted becomes smaller, and computing a sum P of the transmission powers by the following expression for each shared channel mobile station, $$P = \sum_{i=1}^{N} P_i \times w_i$$

where $w_i$ is a weight of a dedicated channel mobile station to which data is diversity-transmitted, the weight being decided based on the phase difference, $P_i$ is a transmission power for the dedicated channel mobile station and N is the number of the dedicated channel mobile stations to which data is currently diversity-transmitted using a dedicated channel, and regarding the sum of the transmission power as the degree of interference.

Base Station

A second aspect of the present invention is a base station which transmits an identical packet or data to mobile stations via a plurality of transmission antennas based on a transmission diversity system, comprising: a transmission phase difference monitoring unit which monitors a transmission phase (first transmission phase) for each mobile station, when a packet is diversity-transmitted to mobile stations using a shared channel, and monitors a transmission phase (second transmission phase) for each mobile station, when data is diversity-transmitted to other mobile stations using a dedicated channel; and a scheduler which calculates, by making use of the first and second transmission phases for each shared channel mobile station to which a pilot is diversity-transmitted using the shared channel, a degree of interference in all the dedicated channel mobile stations to which data is diversity-transmitted using the dedicated channel, the interference being generated when a packet is diversity-transmitted to a shared channel mobile station, and transmits a packet to a predetermined shared channel mobile station assigned preferentially according to the degree of interference.

The scheduler further comprises a station number calculation unit which calculates, for each shared channel mobile station, the number of dedicated channel mobile stations to which data is diversity-transmitted in a same transmission phase as the transmission phase of the shared channel mobile station, and a control unit which regards the number of the dedicated channel mobile stations as the degree of interference, and controls so as to transmit preferentially a packet to a shared channel mobile station whose degree of interference is lowest.

The scheduler further comprises a computing unit which finds dedicated channel mobile stations to which data is diversity-transmitted in a same transmission phase as the transmission phase of a shared channel mobile station for each shared mobile station, and computes a sum transmission power for these dedicated channel mobile stations, and a control unit which regards the sum of the transmission powers as the degree of interference, and controls so as to transmit preferentially a packet to a shared channel mobile station whose degree of interference is lowest.

The scheduler further comprises a weight setting unit which increases a weight as a phase difference between a transmission phase of a shared channel mobile station and a transmission phase of a dedicated channel mobile station to which data is diversity-transmitted becomes smaller, and a control unit which calculates weights of dedicated channel mobile stations to which data is diversity-transmitted using the dedicated channel, based on the phase differences for each shared channel mobile station, regards the sum of the weights as the degree of interference, and controls so as to transmit with preferentially a packet to a shared channel mobile station whose degree of interference is the lowest.

The scheduler further comprises a weight setting unit which increases a weight of transmission power as a phase difference between a transmission phase of a shared channel mobile station and a transmission phase of a dedicated channel mobile station to which data is diversity-transmitted becomes smaller, and a control unit which computes a sum P of the transmission powers by the following expression for each shared channel mobile station, $$P = \sum_{i=1}^{N} P_i \times w_i$$

where $w_i$ is a weight of a dedicated channel mobile station to which data is diversity-transmitted, the weight being decided based on the phase difference, $P_i$ is a transmission power for the dedicated channel mobile station and N is the number of the dedicated channel mobile stations to which data is currently diversity-transmitted using the dedicated channel, regards the sum of the transmission powers as the degree of interference, and controls so as to transmit a packet preferentially to a shared channel mobile station degree of interference is the lowest.

BRIEF DESCRIPTION OF THE DRAWINGS

FIG. 3 is a data example of a weight holding unit;

FIG. 4 is a data example of a CQI holding unit;

FIG. 5 is a data examples of a packet buffer unit;

DESCRIPTION OF THE PREFERRED EMBODIMENTS (A) Principle of Scheduling of this Invention HSDPA is a shared channel which requires high transmission power. This means that interference with a dedicated channel communicating voice/image data is high. In particular, when both transmission diversity and HSDPA are used, interference in a dedicated channel increases if a transmission phase which generates at a time when a packet is diversity-transmitted to a predetermined mobile station via HSDPA is the same as a transmission phase which generates at a time when data is diversity-transmitted via the dedicated channel. When the transmission phase of a packet which is transmitted via HSDPA is an opposite phase of the transmission phase of the dedicated channel, on the other hand, interference in the dedicated channel is small. Therefore interference can be decreased if scheduling is performed considering the transmission phase which generates at a time when a packet is diversity-transmitted to a predetermined mobile station via a shared channel of HSDPA and the transmission phase which generates at a time when data is diversity-transmitted to a mobile station via a dedicated channel.

Specifically, when there are a plurality of mobile stations to which a packet is transmitted via a shared channel of HSDPA, a number of dedicated channel mobile stations to which data is diversity-transmitted in a same phase as the transmission phase of a packet which is diversity-transmitted via HSDPA is checked, and allocation scheduling to allocate a shared channel of HSDPA to the mobile stations is performed so that this number of mobile stations becomes small. Or dedicated channel mobile stations to which data is diversity-transmitted in a same transmission phase as the transmission phase of a packet are found for each packet transmission destination mobile station, the sum of transmission power to these dedicated channel mobile stations is computed for each packet transmission destination mobile station, and the shared channel is allocated preferentially to the packet transmission destination mobile station of which sum of the transmission power is small. Thereby the wireless resource can be effectively used.

The transmission diversity is for rotating one antenna phase out of the two transmission antennas, and narrowing down the transmission beam, so as to increase the transmission power to the target mobile station. For example, reception power increases at a point where phases of the transmission waves from two transmission antennas accord with each other. At the points where the respective transmission wave phases are the opposite, on the other hand, the reception power becomes very low. In an actual operation, transmission wave phases are determined by a method of selecting one of the n types of phases (ex. 0, $\pi/2$, $\pi$, $3\pi/2$)

(B) Configuration of Base Station

Figure 1:
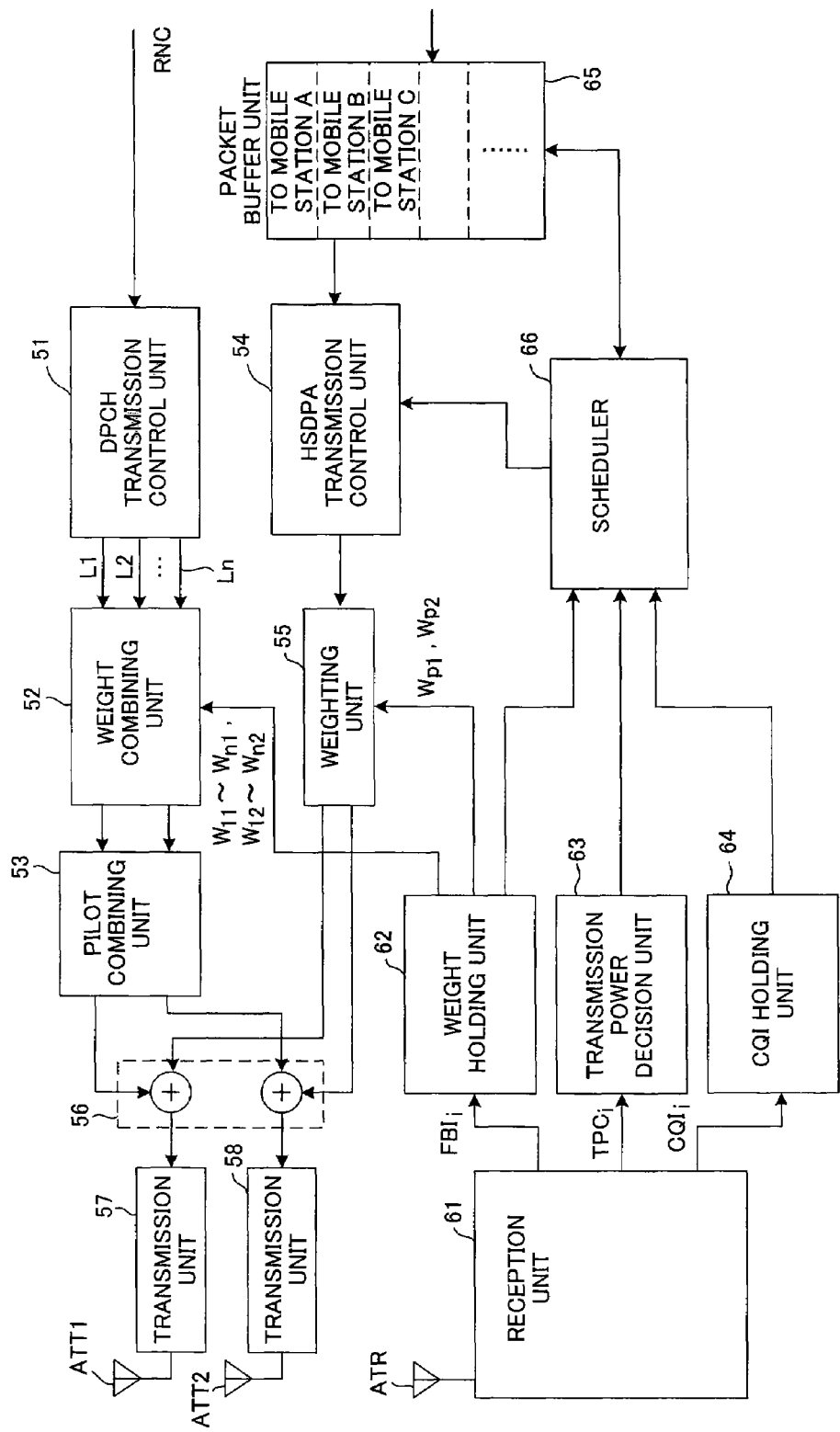
FIG. 1 is a block diagram of principal part of a base station of the present invention.

FIG. 1 is a block diagram of principal part of the base station of the present invention, where an identical packet or data is transmitted to the mobile stations using two transmission antennas ATT1 and ATT2 based on the transmission diversity system. The base station has HSDPA functions to transmit a packet to mobile stations at high-speed using a shared channel, and dedicated transmission functions to transmit data of a CS (Cuicuit-Switched) call using a dedicated channel DPCH, such as voice data and video data.

The DPCH transmission control unit (dedicated channel transmission control unit) 51 performs baseband signal processing (e.g. encoding, QPSK data modulation, code spread processing) on voice data and control data to be sent to each mobile station via the dedicated channel DPCH, for each mobile station, and transmits transmission signals for each mobile station to the output lines L1 to Ln. A weight combining unit 52 multiplies the DPCH transmission signals to be transmitted to the i-th (i=1 to n) mobile stations by the weights wi1 and wi2, combines each multiplication result of wi1 and combines each multiplication result of wi2, and outputs them. A pilot combining unit 53 generates pilot signals P1 and P2, adds them to the combined signals which are output from the weight combining units 52, and outputs the results.

Figure 2:
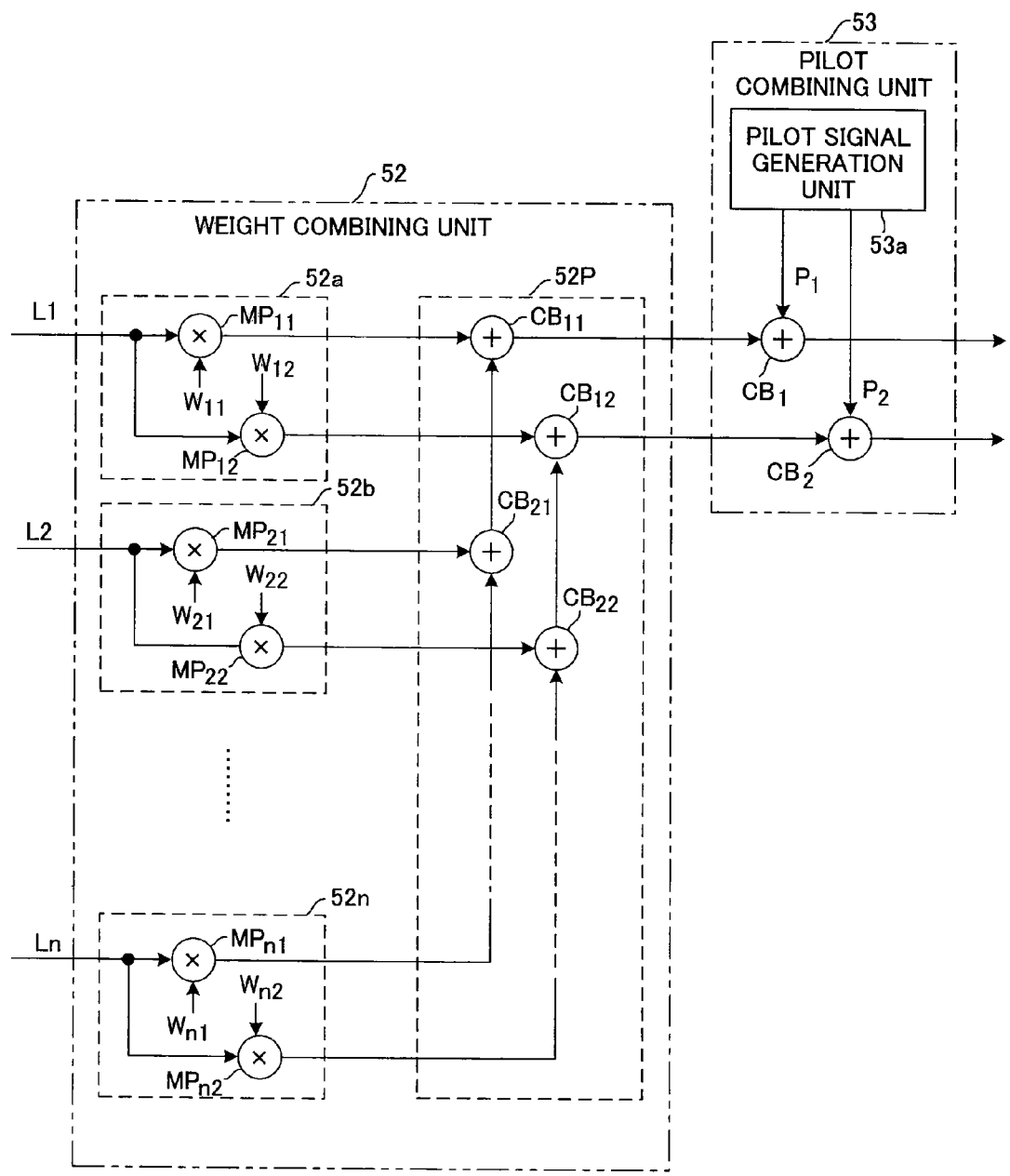
FIG. 2 is a diagram depicting a configuration of a weight combining unit and pilot combining unit.

FIG. 2 is a diagram depicting a configuration of the weight combining unit and pilot combining unit. The weight combining unit 52 has the weighting units 52a to 52n and combining unit 52p. Each of the weighting units 52a to 52n has two multipliers MPi1 and MPi2 (i=1 to n) respectively, so that a transmission signal addressed to each mobile station is multiplied by the weights wi1 and wi2 (i=1 to n), the combining unit 52p combines signals which are output from the multiplier MPi1 (i=1 to n) of the weighting units 52a to 52n, so as to generate a signal to be input to the first transmission antenna ATT1, and combines signals which are output from the multiplier Mpi2 (i=1 to n), so as to generate a signal to be input to the second transmission antenna ATT2. The pilot combining unit 53 inputs the pilot signals P1 and P2, which are generated by a pilot signal generation unit 53a and which are orthogonal to each other, to the combining units CB1 and CB2, and the combining units CB1 and CB2 combine the first and second antenna input signals, which are output from the weight combining unit 52, with the pilot signals P1 and P2, and output the combined signals.

An HSDPA transmission control unit 54 performs baseband signal processing (e.g. encoding, data modulation, code diffusion processing) for transmitting packet data addressed to a specified mobile station via a shared channel, and outputs a packet signal. A weighting unit 55 has two multipliers, so as to multiply a signal which is output from the HSDPA transmission control unit 54 by the weights wp1 and wp2 according to the packet transmission destination mobile station, in order to generate signals to be input to the first and second transmission antennas ATT1 and ATT2. The combining unit 56 combines the signals which are input to the first and second transmission antennas ATT1 and ATT2 via the pilot combining unit 53 and the weighting unit 55 respectively, and transmits it to the mobile stations from the transmission units 57 and 58 via the transmission antennas ATT1 and ATT2.

A reception unit 61 divides a signal which the reception antenna ATR received from each mobile station, and extracts the weights wi1 and wi2 (i=1 to n) of the transmission diversity from the signal received from each mobile station, and saves them in a weight holding unit 62, and extracts the transmission power control bit TPCi (i=1 to n) and inputs it to a transmission power decision unit 63, and extracts CQIi (i=1 to n) and saves it in a CQI holding unit 64.

As FIG. 3 shows, the weight holding unit 62 stores the type of HSDPA call/CS call, and the weights w1 and w2 of the diversity transmission for each mobile station, inputs the weights wi1 and wi2 (i=1 to n) of a mobile station to which data is diversity-transmitted via a dedicated channel DPCH to the weight combining unit 52, and inputs the weights wp1 and wp2 of the mobile station to which packets are diversity-transmitted via the HSDPA channel to the weighting unit 55.

The transmission power decision unit 63 increases the transmission power Pi by a predetermined amount ΔP if the transmission power control bit TPCi, which is sent from each mobile station via a dedicated channel DPCH, is "1", and decreases the transmission power Pi by the set amount ΔP if "0". By performing this transmission power control for each mobile station, the transmission power decision unit 63 holds the transmission power Pi for all the mobile stations. The CQI holding unit 64 holds the CQI which is notified from a mobile station for each mobile station, as shown in FIG. 4. A packet buffer unit 65 holds packets for each mobile station, which are received from a radio network control unit RNC. This packet buffer unit 65 stores a transmission packet amount, buffer storing start time, and packets to be transmitted corresponding to the station ID of the packet transmission destination mobile station, as shown in FIG. 5.

A scheduler 66 controls such that interference of the shared channel of HSDPA in non-HSDPA channel communication, such as dedicated channel communication, is decreased, according to the later mentioned processing flow. The scheduler 66 determines the modulation system and encoding system used for packet transmission based on the CAI of the packet transmission destination mobile station, and instructs the HSDPA transmission control unit 54 to send the packet.

(C) Scheduling
(a) First Scheduling Processing

Figure 6:
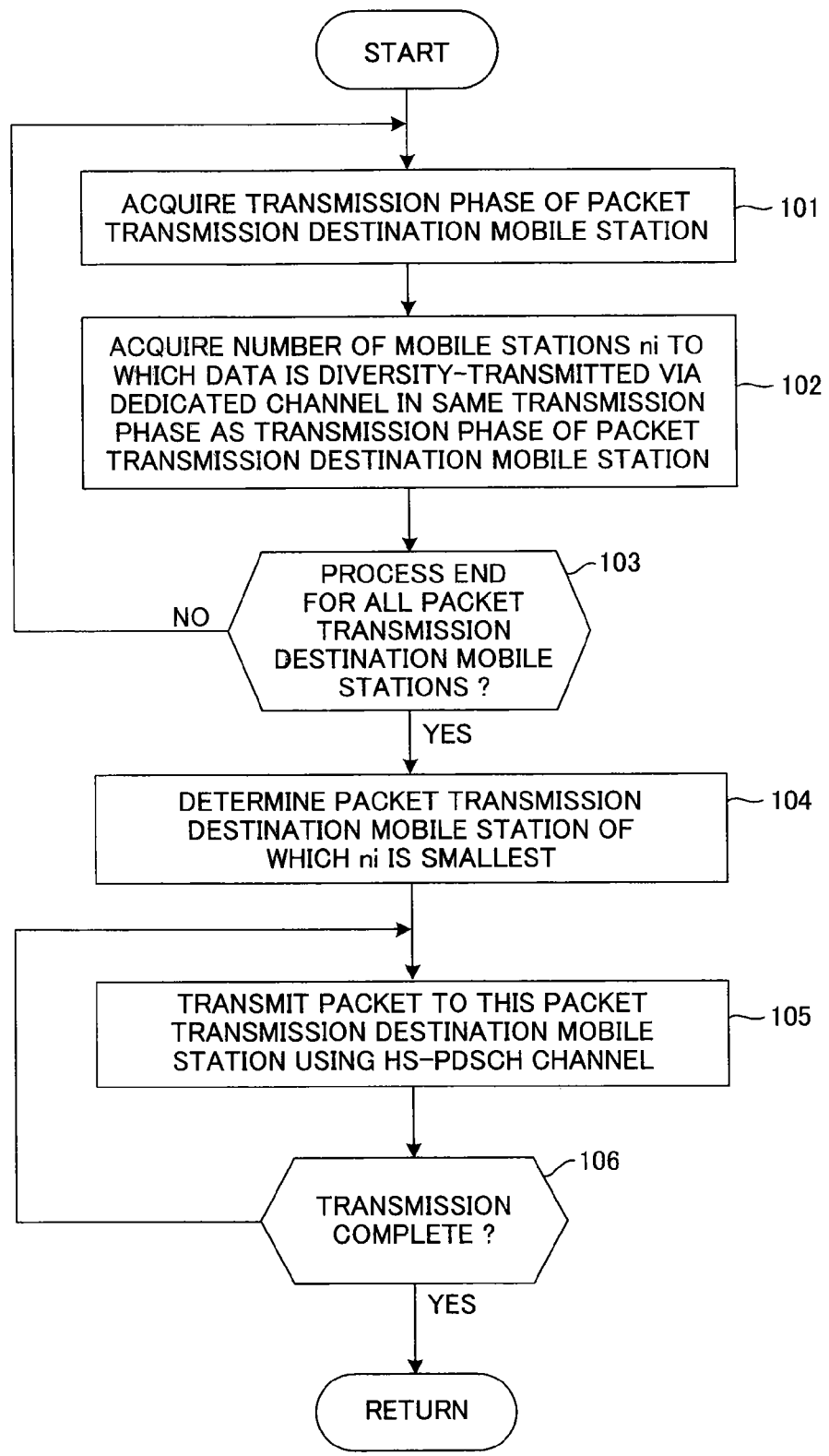
FIG. 6 is a flow chart depicting a first scheduling processing of the present invention.

FIG. 6 is a first scheduling processing flow of the present invention. In the first scheduling processing, for each packet transmission destination mobile station (HSDPA channel mobile station), a number of dedicated channel mobile stations to which data is diversity-transmitted in a same transmission phase as the transmission phase of a packet which is diversity-transmitted to the HSDPA channel mobile station, is determined and a packet is diversity-transmitted preferentially to an HSDPA channel mobile station of which this number of dedicated channel mobile stations is smallest.

First the scheduler 66 refers to the stored content of the weight holding unit 62, and acquires the transmission phase of a mobile station to which a packet is diversity-transmitted via a shared channel of HSDPA (step 101). Then the scheduler 66 refers to the storage content of the weight holding unit 62 and acquires the number(ni) of dedicated channel mobile stations to which data is diversity-transmitted via dedicated channel in a same transmission phase as the transmission phase of the packet transmission destination mobile station (step 102). Then the scheduler 66 checks whether the processing in step 102 completed for all the packet transmission destination mobile stations (step 103), and repeats processing in step 101 and later if the processing is not completed.

If the processing in step 102 is completed for all the packet transmission destination mobile stations, the scheduler 66 determines a packet transmission destination mobile station of which the number of mobile stations ni is smallest (step 104), allocates the shared channel of HSDPA to this packet transmission destination mobile station, and instructs the HSDPA transmission control unit 54 to send the packet. The HSDPA transmission control unit 54 reads a packet addressed to the instructed mobile station from the buffer unit 65, executes a predetermined processing, and diversity-transmits it via the weighting unit 55 combining unit 56 and transmission units 57-58(steps 105, 106).

Figure 7:
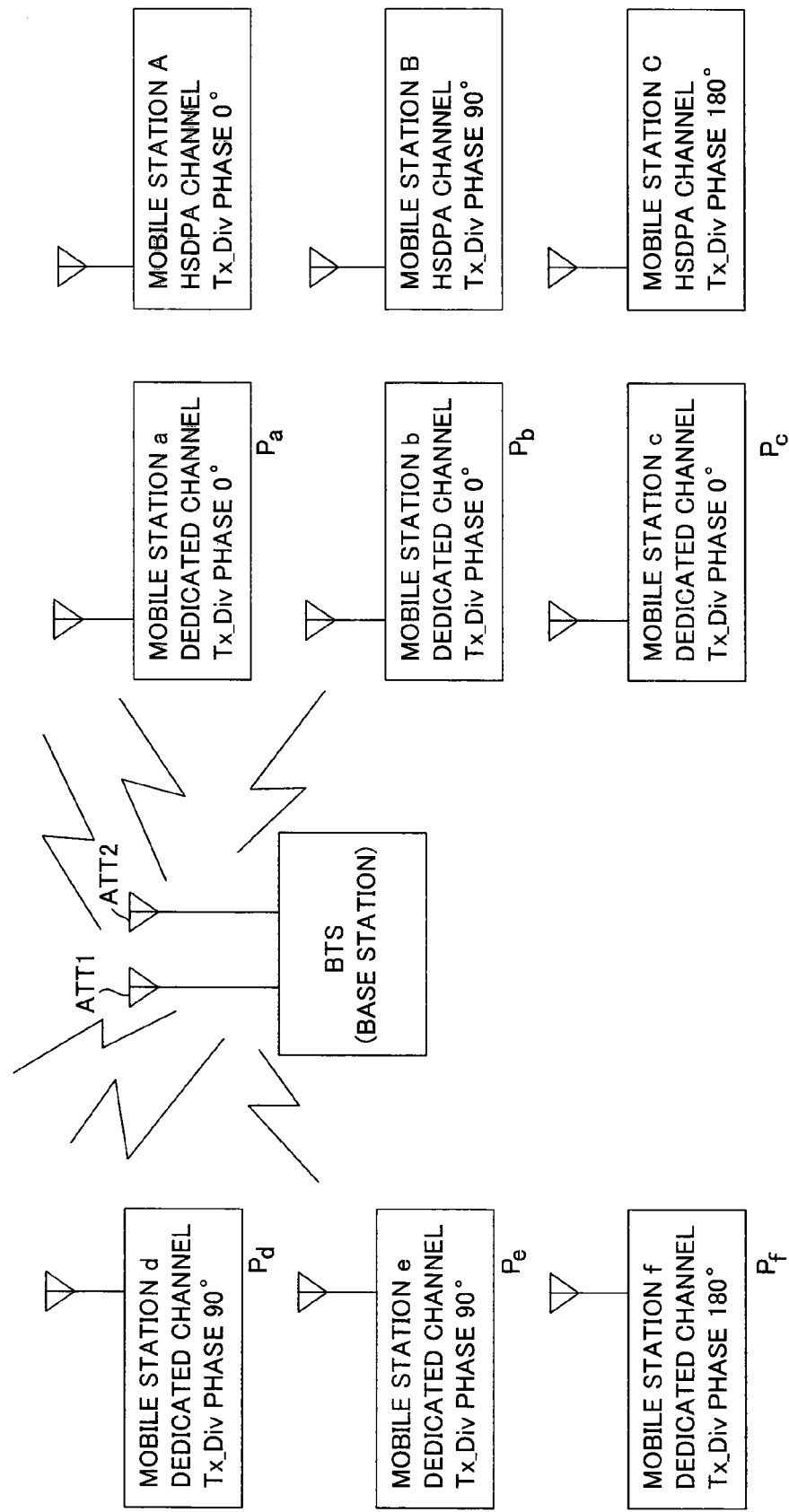
FIG. 7 is a diagram depicting the first scheduling processing.

The first scheduling processing under the following conditions will be described. As FIG. 7 shows, the conditions are
1) mobile stations that use an HSDPA channel (shared channel) are A, B and C,
2) mobile stations to which data is diversity-transmitted using a voice channel (dedicated channel) are a, b, c, d, e and f,
3) there are four types of phase states of the transmission diversity (Tx_Div): state 0=0°, state 1=90°, state 2=180° and state 3=270°,
4) the phase states are A=0, B=1 and C=2, that is the transmission phases of A,B and c are 0°, 90° and 180° respectively and
5) the phase states are a=0, b=0, c=0, d=1, e=1 and f=2.

In the above states, a number of dedicated channel mobile stations having a same phase as the phase of the shared channel mobile station A is 3 (a, b and c), a number of dedicated channel mobile stations having a same phase as the shared channel mobile station B is 2 (d and e), and a number of dedicated channel mobile stations having dedicated channel mobile stations having a same phase as the shared channel mobile station C is 1 (f). The scheduler 66 regards the number of stations as a degree of interference, and interference in the dedicated channel mobile stations is decreased by allocating preferentially the packet of the shared channel mobile station C to the HSDPA channel and transmitting it.

As described above, according to the first scheduling processing, interference in the dedicated channel mobile station can be minimized even if packets are transmitted at high power using a shared channel of HSDPA.

The above is an example of allocating an entire shared channel to a mobile station of which degree of interference (number of mobile stations ni) is smallest. However one frame of a shared channel of HSDPA consists of 15 slots, and packets of a plurality of mobile stations can be allocated to each slot, so that time division multiplexed packets can be transmitted. Therefore it is possible to construct such that more slots are allocated to a packet of a mobile station of which degree of interference is smaller, and the packets are time-division multiplexed in a plurality of mobile stations, and sent. This is the same for the scheduling processing herein below.

(b) Second Scheduling Processing

Figure 8:
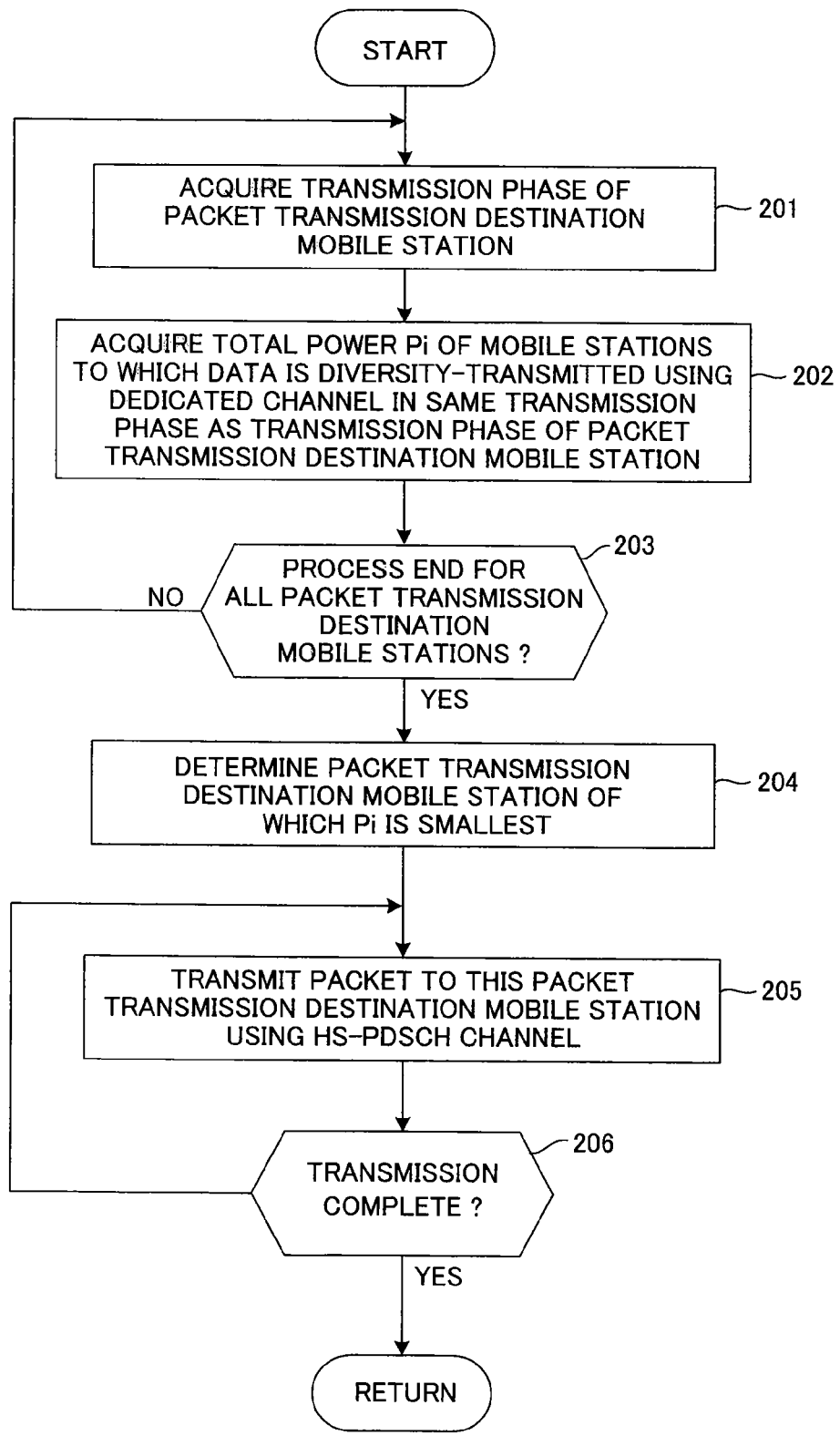
FIG. 8 is a flow chart depicting a second scheduling processing of the present invention.

FIG. 8 is a second scheduling processing flow of the present invention. In the second scheduling processing, for each packet transmission destination mobile station (HSDPA channel mobile station), a number of dedicated channel mobile stations to which data is diversity-transmitted in a same transmission phase as the transmission phase of a packet which is diversity-transmitted to the HSDPA channel mobile station, is determined, then a sum of the transmission powers for these dedicated channel mobile stations is computed for each HSDPA channel mobile station, and a packet is transmitted, with priority, to a packet transmission destination mobile station of which this sum of transmission power is smallest.

The scheduler 66 refers to the stored content of the weight holding unit 62, and acquires the transmission phase of a mobile station to which a packet is diversity-transmitted via a shared channel of HSDPA (step 201). Then the scheduler 66 obtains all the dedicated channel mobile stations to which data is diversity-transmitted in a same transmission phase as the transmission phase of the packet transmission destination mobile station, with reference to the stored content of the weight holding unit 62, acquires the transmission powers for these obtained dedicated channel mobile stations from the transmission power decision unit 63, and computes a sum Pi of this transmission power (step 202).

Then the scheduler 66 checks whether the processing in step 202 completed for all the packet transmission destination mobile stations (step 203), and repeats processing in step 201 and later if the processing is not completed. If the processing in step 202 is completed for all the packet transmission destination mobile stations, however, the scheduler 66 determines a packet transmission destination mobile station of which the sum Pi of the transmission power is smallest (step 204), allocates the shared channel of HSDPA to this packet transmission destination mobile station, and instructs the HSDPA transmission control unit 54 to send the packet. The HSDPA transmission control unit 54 reads a packet addressed to the instructed mobile station from the buffer unit 65, executing a predetermined processing, and diversity-transmits it via the weighting unit 55, combing unit 56 and transmission units 57-58 (steps 205, 206).

The second scheduling processing under the state in FIG. 7 will now be described. Here the transmission power to the dedicated channel mobile stations a, b, c, d, e and f are assumed to be P(a), P(b), ... P(f).

The sum of the transmission power for each dedicated channel mobile station, of which phase is the same as the phase of the HSDPA mobile station A, is P(a)+P(b)+P(c), the sum of the transmission power for each dedicated channel mobile station, of which phase is the same as the phase of the HSDPA mobile station B, is P(d)+P(e), and the sum of the transmission power for the dedicated channel mobile station, of which phase is the same as the phase of the HSDPA mobile station C is P(f). The scheduler 66 regards the sum of the transmission power as a degree of interference, and allocates a packet destined for an HSDPA mobile station, of which the sum of transmission power is the smallest, to the HSDPA channel. Thereby interference in a dedicated channel mobile stations can be decreased.

As described above, according to the second scheduling processing, the sum of the transmission power of the dedicated channel, with which the shared channel of HSDPA interferes, is regarded as a degree of interference, and the shared channel is allocated such that this degree of interference becomes small. As a result, interference in dedicated channel mobile stations can be minimized even if packets are transmitted using a shared channel of HSDPA.

(c) Third Scheduling Processing

Figure 9:
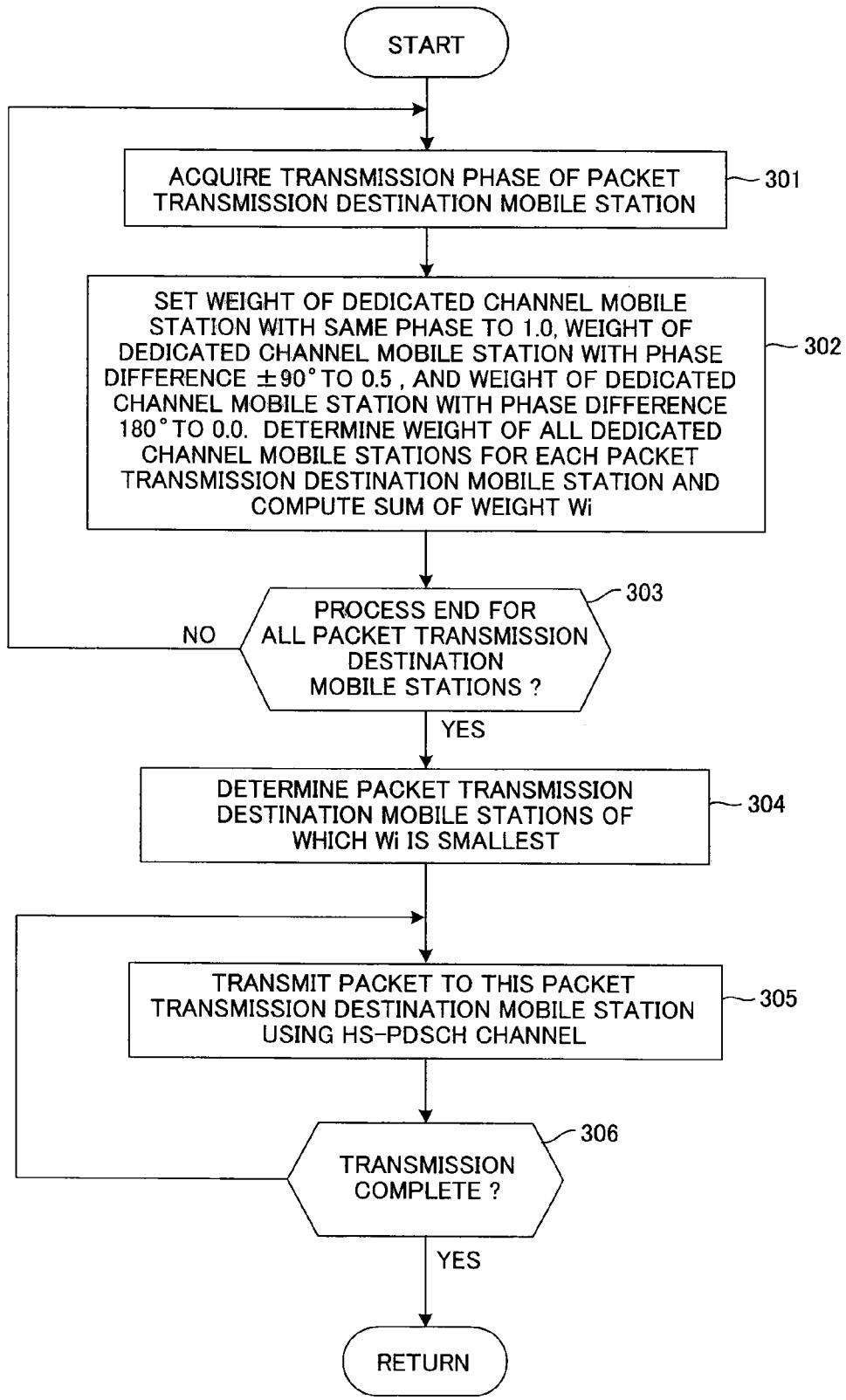
FIG. 9 is a flow chart depicting a third scheduling processing of the present invention.

FIG. 9 is a third scheduling processing flow of the present invention. In the third scheduling processing, a weight of the transmission power is increased as the difference between transmission phase of the packet transmission destination mobile station to which packet is diversity-transmitted via a shared channel of HSDPA and the transmission phase of a dedicated channel mobile station to which data is diversity-transmitted via a dedicated channel becomes smaller. And the weights of all the dedicated channel mobile stations are determined for each packet transmission destination mobile station, the sum of this weight is calculated, and a packet is transmitted, with priority, via the shared channel, to a packet transmission destination mobile station of which this sum of weights is smallest.

The scheduler 66 refers to the stored content of the weight holding unit 62, and acquires the transmission phase of a mobile station to which a packet is diversity-transmitted via the shared channel of HSDPA (step 301). Then (1) the weight of a dedicated channel mobile station, of which transmission phase is the same as the phase of the packet transmission destination mobile station, is set to 1.0, (2) the weight of a dedicated channel mobile station, of which transmission phase difference from that of the packet transmission destination mobile station is ±90°, is set to 0.5, and (3) the weight of a dedicated channel mobile station, of which transmission phase difference from that of the packet transmission destination mobile station is 180°, is set to 0.0.

Then the scheduler 66 determines the differences between the transmission phase of the packet transmission destination mobile station acquired in step 310 and the transmission phases of all the dedicated channel mobile stations, and computes the sum Wi of the weights according to each phase difference (step 302).

Then the scheduler 66 checks whether processing in step 302 is completed for all the packet transmission destination mobile stations(shared channel mobile stations) (step 303), and repeats processing in step 310 and later if the processing is not completed.

If the processing in step 302 is completed for all the packet transmission destination mobile stations, however, the scheduler 66 determines a packet transmission destination mobile station of which the sum Wi of the weight is smallest (step 304), allocates the shared channel of HSDPA to this packet transmission destination mobile station, and instructs the HSDPA transmission control unit 54 to send the packet. The HSDPA transmission control unit 54 reads a packet addressed to the instructed mobile station from the buffer unit 65, executes a predetermined processing, and diversity-transmits it to the weighting unit 55, combining unit 56 and transmission units 57-58 (steps 305, 306).

Thereby the allocation of the shared channel of HSDPA is controlled considering the phase difference between the transmission phase of the shared channel mobile station of HSDPA and the transmission phase of a dedicated channel mobile station, so that the sum of weights become small, therefore interference in the dedicated channel mobile stations can be minimized.

(d) Fourth Scheduling Processing

Figure 10:
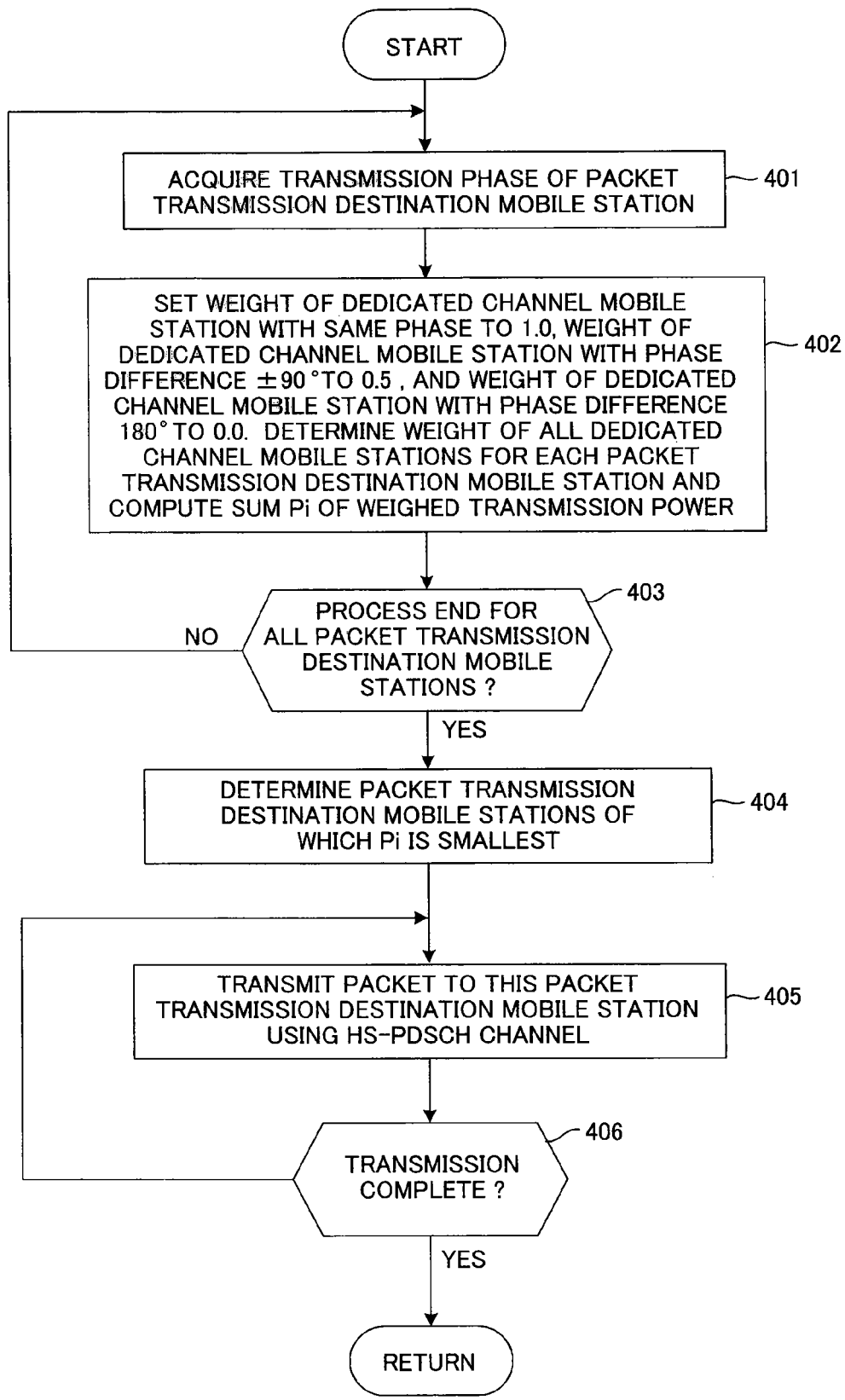
FIG. 10 is a flow chart depicting a fourth scheduling processing of the present invention.

FIG. 10 is a fourth scheduling processing flow of the present invention. In the fourth scheduling processing, a weight of the transmission power is increased as the phase difference between the transmission phase of the packet transmission destination mobile station to which packet is diversity-transmitted via a shared channel of HSDPA and the transmission phase of a dedicated channel mobile station to which data is diversity-transmitted via a dedicated channel becomes smaller. And the weights of the transmission power of all the dedicated channel mobile stations are determined for each packet transmission destination mobile station, the sum of this weighted transmission power is calculated for each packet transmission destination mobile station, and a packet is transmitted, with priority, to a packet transmission destination mobile station of which the sum of the transmission power is smallest via the shared channel.

The scheduler 66 refers to the stored content of the weight holding unit 62, and acquires the transmission phase of a mobile station to which a packet is diversity-transmitted via a shared channel of HSDPA (step 401). Then (1) the weight of a dedicated channel mobile station, of which transmission phase is the same as the phase of the packet transmission destination mobile station, is set to 1.0, (2) the weight of a dedicated channel mobile station, of which phase difference from the transmission phase of the packet transmission destination mobile station is ±90°, is set to 0.5, and (3) the weight of a dedicated channel mobile station, of which phase difference from the transmission phase of the packet transmission destination mobile station is 180°, is set to 0.0.

Then the scheduler 66 determines the differences between the transmission phase of the packet transmission destination mobile station acquired in step 401 and the transmission phases of all the dedicated channel mobile stations, and computes a weight wi according to each phase difference. Then the scheduler 66 computes the sum P of the transmission power by the following expression, $$P = \sum_{i=1}^{N} P_i \times w_i \tag{1}$$

where Pi is the transmission power for each dedicated channel mobile station and N is a number of mobile stations to which data is currently diversity-transmitted via a dedicated channel (step 402).

Then the scheduler 66 checks whether processing in step 402 is completed for all the packet transmission destination mobile stations (step 403), and repeats processing in step 401 and later if the processing is not completed.

If the processing in step 402 is completed for all the packet transmission destination mobile stations, however, the scheduler 66 determines a packet transmission destination mobile station of which the sum Pi of the weight transmission power is smallest (step 404), and instructs the HSDPA control unit 54 to send a packet to this packet transmission destination mobile station. The HSDPA transmission control unit 54 reads the instructed packet addressed to the mobile station from the buffer unit 65, executes a predetermined processing, and diversity-transmits via the weighting unit 55, combining unit 56 and transmission units 57-58 (steps 405, 406).

Thereby the allocation of the shared channel of HSDPA is controlled considering the weight based on the phase difference between the transmission phase of the shared channel mobile station of HSDPA and the transmission phase of a dedicated channel mobile station, so that the sum of weighted transmission power becomes small, therefore the interference in the dedicated channel mobile stations can be minimized.

Now the fourth scheduling processing in the state in FIG. 7 will be described. The sum of the weighted transmission power for the dedicated channel mobile stations which suffer interference of the HSDPA mobile station A is P(a)+P(b)+P(c)+0.5(P(d)+P(e)).

In the same manner, the sum of weighted transmission power for dedicated channel mobile stations which suffer interference of the HSDPA mobile station B is P(d)+P(e)+0.5(P(a)+P(b)+P(c)+P(f)).

The sum of weighted transmission power for dedicated channel mobile stations which suffer interference of the HSDPA mobile station C is P(f)+0.5(P(d)+P(e)).

Regarding this sum of the weighted transmission power as interference in dedicated channel mobile stations, the scheduler 66 allocates the packet declined for an HSDPA mobile station, of which the sum of weighted transmission power is smallest, to the HSDPA channel. Thereby interference with dedicated channel mobile stations can be decreased.

The third and fourth scheduling processing are cases where the transmission diversity is controlled in a 90° unit transmission phase, that is 0°, 90°, 180° and 270° (=−90°), but the third and fourth scheduling can also be applied to the case of controlling the transmission phase in 45° units, for example. In this case, if the difference between the transmission phase of the packet transmission destination mobile station and the transmission phase of the dedicated channel mobile station to which data is diversity-transmitted via a dedicated channel represented by is $\phi$, the weight w is determined as $$w = \cos(|\phi|/2) \tag{2}$$

for example. Or the weight w is determined as $$w = \cos(|\phi|/2) \quad |\phi| \leq 90°$$

$$w = \cos(|\phi| - 90°)/\sqrt{2} \quad |\phi| > 90° \tag{3}$$

for example.

(e) Variant Form

The above embodiment does not consider the packet data amount Di to be transmitted, or the time Ti when the packet data is held in the butter of the base station, but these factors may be considered.

Figure 11:
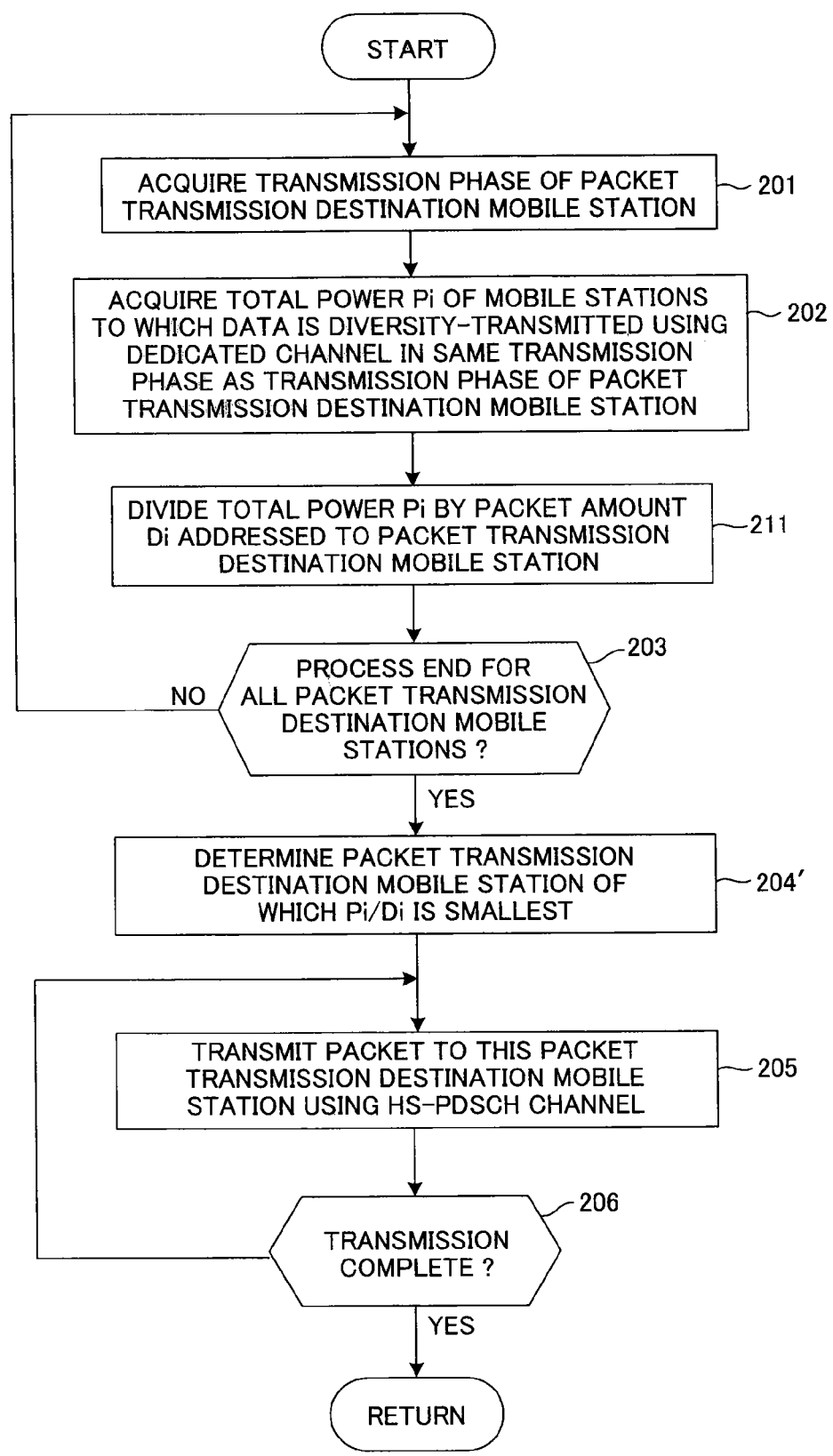
FIG. 11 is a flow chart depicting a scheduling processing of a first variant form of the present invention.

FIG. 11 is a flow chart depicting the scheduling processing of a first variant form of the present invention, and is an example considering the packet data amount Di to be transmitted in the second scheduling processing (FIG. 8), where the same processing as FIG. 8 is denoted with the same step number.

The difference is that the processing in step 211 is added after step 202. In step 211, the scheduler 66 acquires a packet amount Di addressed to the target packet transmission destination mobile station from the buffer 65, divides the sum Pi of the transmission power by this packet amount Di, and stores the division result Pi/Di.

If the processing in steps 202 and 211 is completed for all the packet transmission destination mobile stations, the scheduler 66 determines a packet transmission destination mobile station of which Pi/Di is smallest in step 204', allocates the shared channel of HSDPA to this packet transmission destination mobile station, and instructs the HSDPA transmission control unit 54 to send the packet. The sum Pi may be divided by f(Di) instead of Di, so that a packet transmission destination mobile station, of which division result Pi/f(Di) is smallest, is determined. f(·) is a conversion function.

Figure 12:
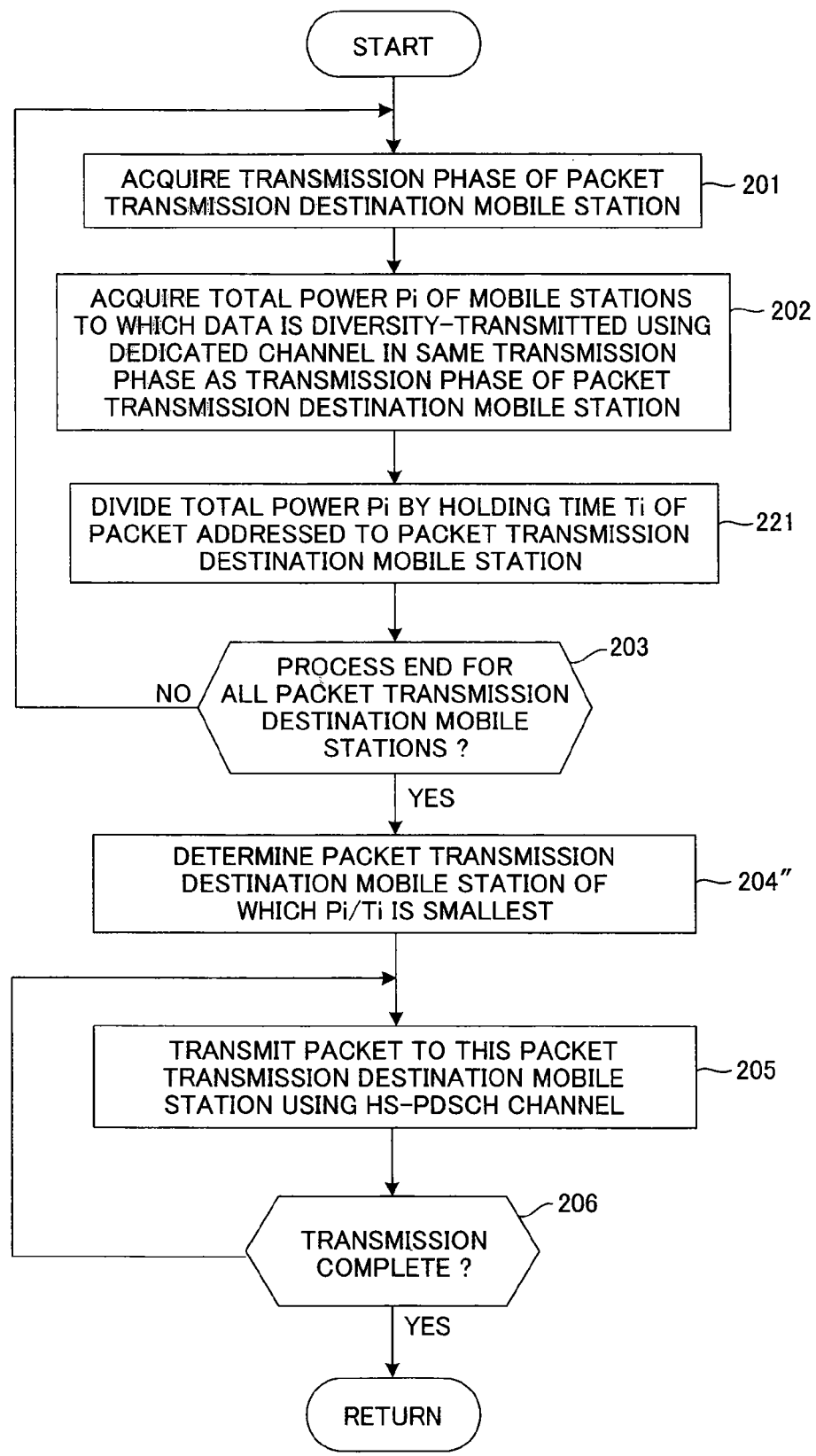
FIG. 12 is a flow chart depicting a scheduling processing of a second variant form of the present invention.
Figure 13:
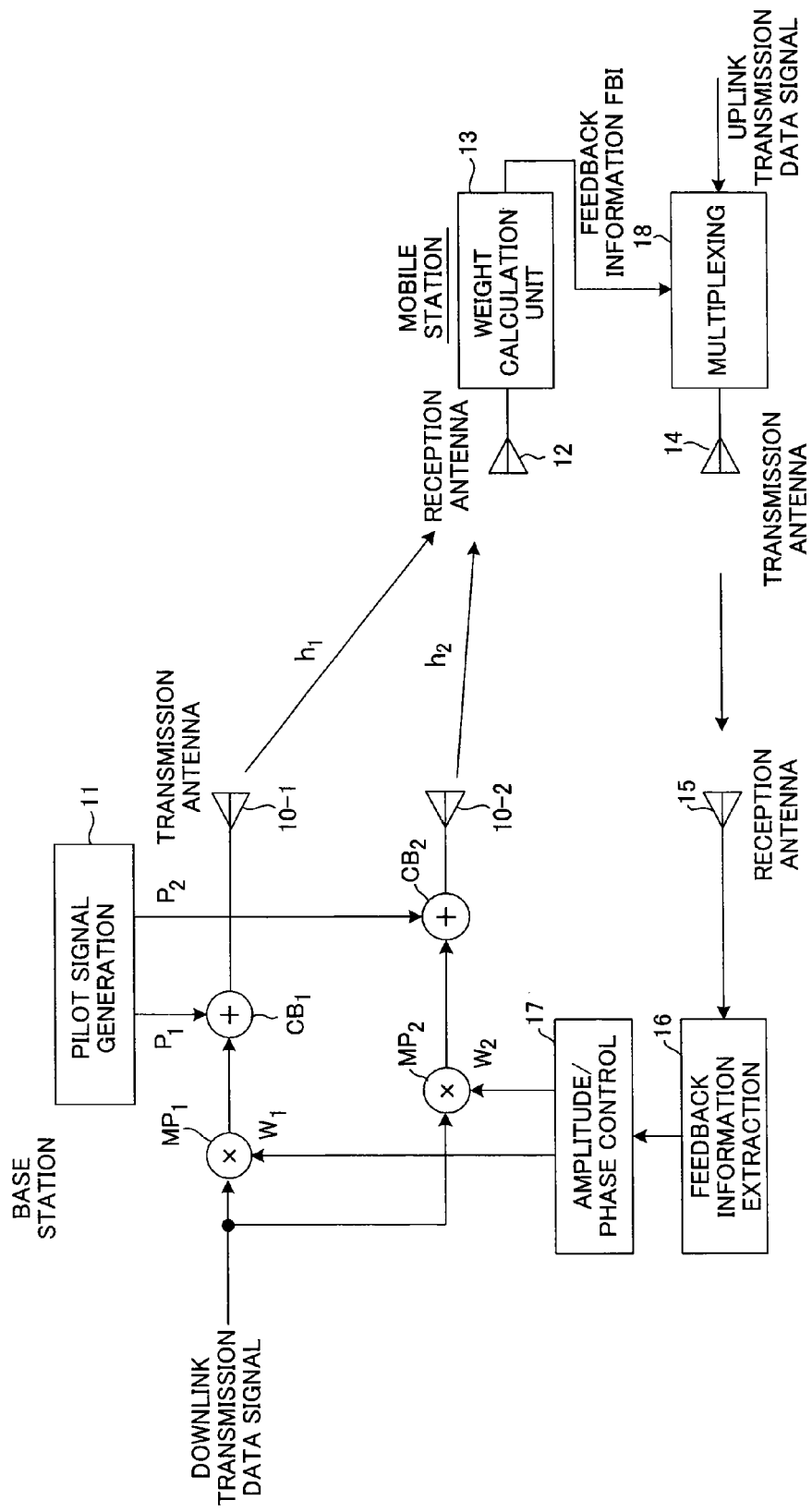
FIG. 13 is a diagram depicting a closed loop transmission diversity system, out of transmission diversity technologies.
Figure 14:
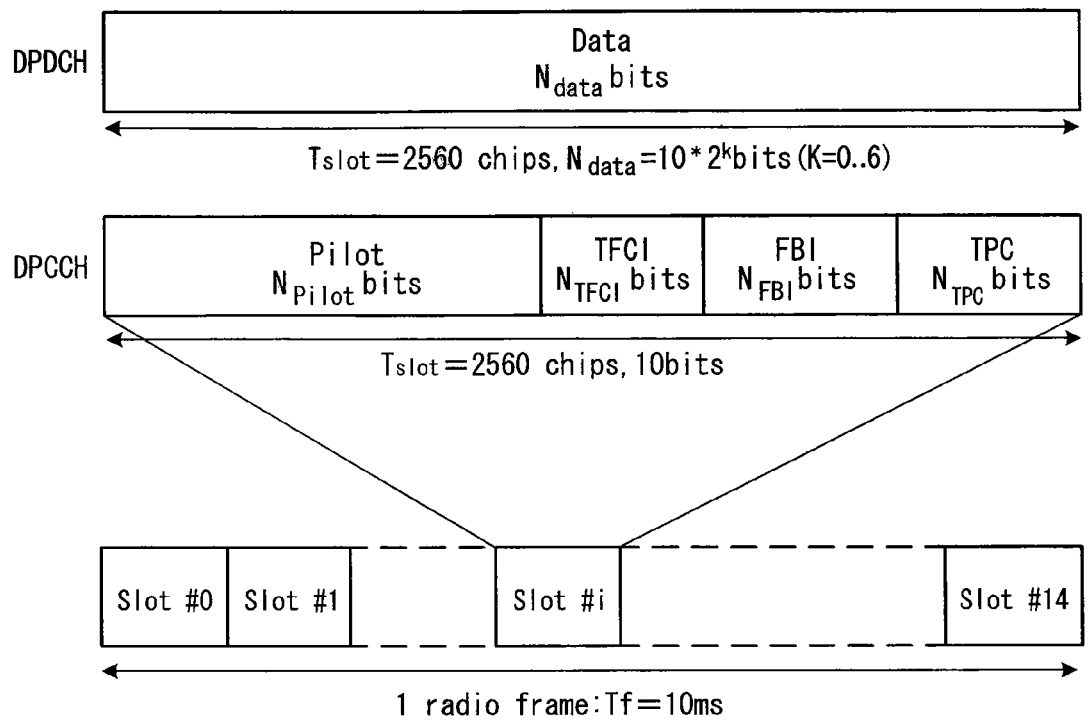
FIG. 14 is a diagram depicting a configuration of a DPCH frame of an uplink.
Figure 15:
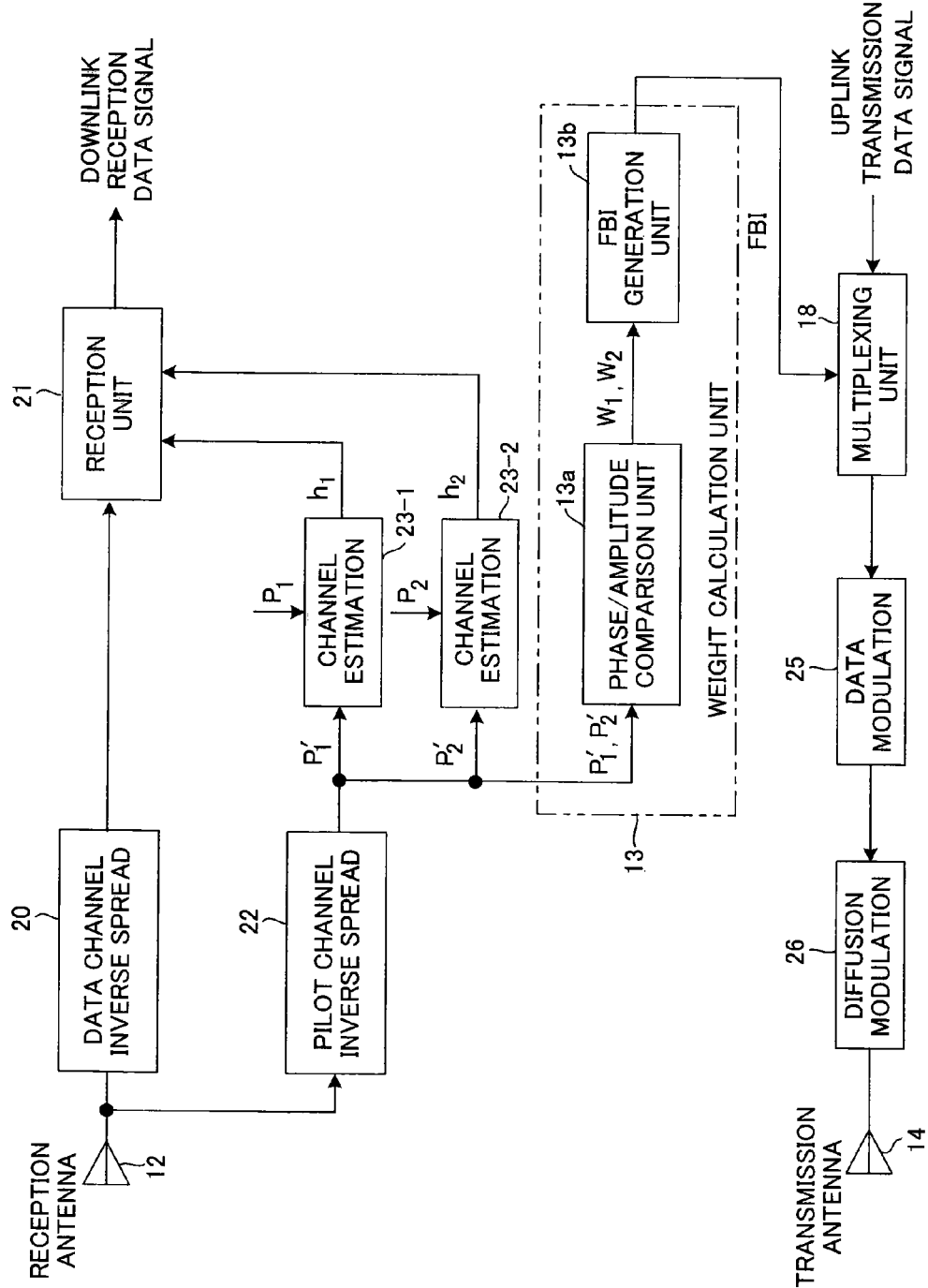
FIG. 15 is a block diagram of a wireless mobile station.
Figure 16:
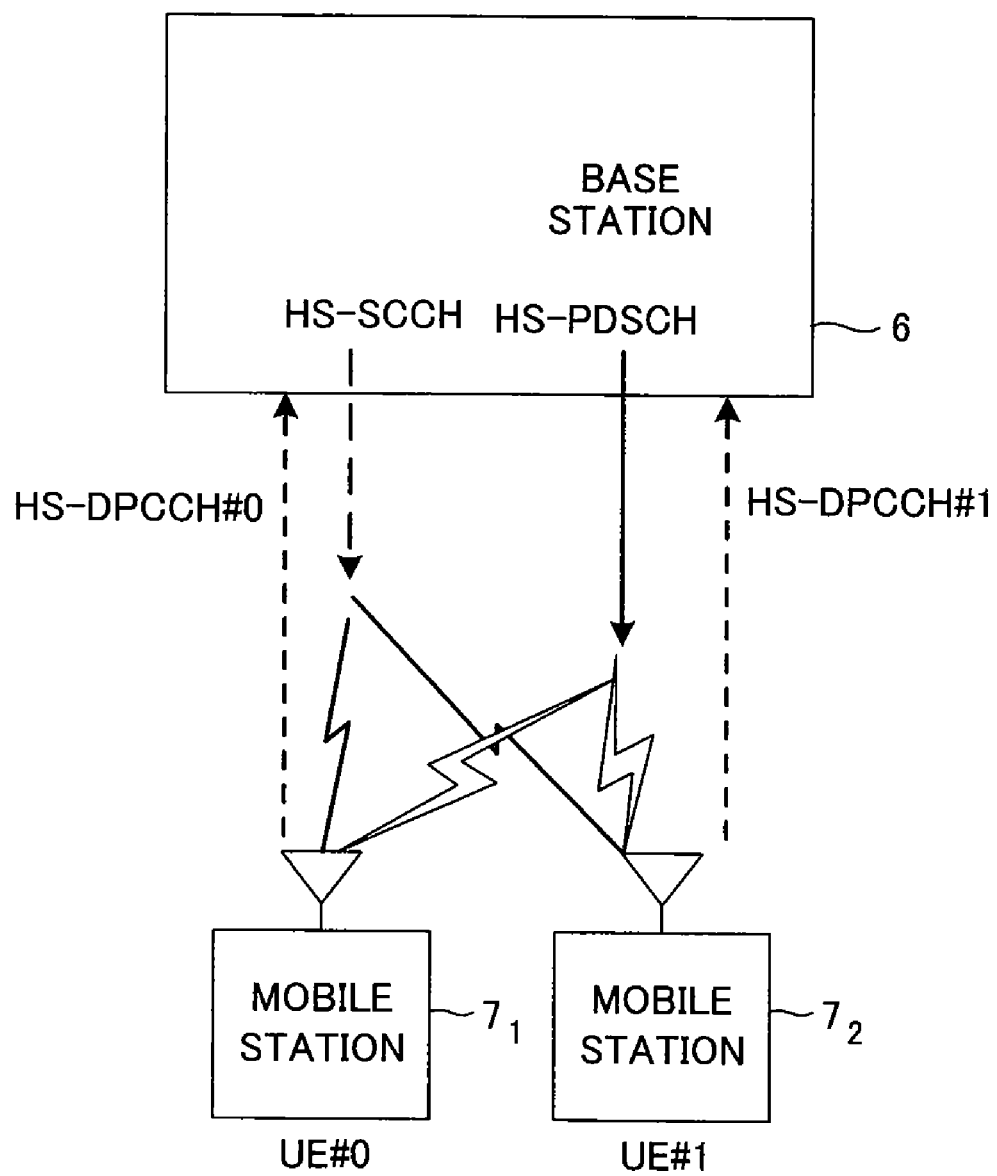
FIG. 16 is a diagram depicting main wireless channels used in HSDPA.

FIG. 12 is a flow chart depicting the scheduling processing of a second variant form of the present invention when the packet data to be transmitted is held without being transmitted in the buffer during time Ti, this time is referred to as holding time. The second variant form is an example where the holding time Ti is considered and in FIG. 12 the same processing as FIG. 8 is denoted with the same step number.

The difference is that the processing in step 221 is added after step 202. In step 221, the scheduler 66 calculates a holding time Ti of the packet addressed to the packet transmission destination mobile station based on the storing start time, which is stored in the buffer 65, divides the sum Pi of the transmission power by this holding time Ti, and stores the division result Pi/Ti.

If the processing in steps 202 and 221 is completed for all the packet transmission destination mobile stations, the scheduler 66 determines a packet transmission destination mobile station of which Pi/Ti is smallest in step 204", allocates the shared channel of HSDPA to this packet transmission destination mobile station, and instructs the HSDPA transmission control unit 54 to send the packet.

The sum Pi may be divided by g(Di) instead of Ti, so that a packet transmission destination mobile station, of which division result Pi/g(Ti) is smallest, is determined. g(·) is a conversion function. The packet data amount Di or the holding time Ti may also be applied to a scheduling processing other than the second scheduling processing.

EFFECT OF THE INVENTION

According to the present invention, interference of HSDPA in dedicated channel communication (e.g. voice and image communication) can be effectively decreased.

What is claimed is:

1. A scheduling method for a base station which transmits an identical packet or data to mobile stations via a plurality of transmission antennas based on a transmission diversity system, the method comprising:
   monitoring a transmission phase (first transmission phase) for each mobile station, when a packet is diversity-transmitted to mobile stations using a shared channel, and monitoring a transmission phase (second transmission phase) for each mobile station, when data is diversity-transmitted to other mobile stations using a dedicated channel;
   calculating, by making use of the first and second transmission phases for each shared channel mobile station to which pilot is diversity-transmitted using the shared channel, a degree of interference in all the dedicated channel mobile stations to which data is diversity-transmitted using the dedicated channel, the interference being generated when a packet is diversity-transmitted to the shared channel mobile station; and
   transmitting a packet to a predetermined shared channel mobile station preferentially, according to the degree of interference.

2. The scheduling method for a base station according to claim 1, wherein
   calculating the degree of interference includes:
   determining the number of dedicated channel mobile stations to which data is diversity-transmitted in a same transmission phase as the transmission phase of the shared channel mobile station, for each shared channel mobile station, and
   regarding the number of the dedicated channel mobile stations as the degree of interference.

3. The scheduling method for a base station according to claim 1, wherein
   calculating the degree of interference includes:
   finding dedicated channel mobile stations to which data is diversity-transmitted in a same transmission phase as the transmission phase of the shared channel mobile station, for each shared channel mobile station;
   computing a sum of transmission power for these dedicated channel mobile stations; and
   regarding the sum of transmission powers as the degree of interference.

4. The scheduling method for a base station according to claim 1, wherein
   calculating the degree of interference includes:
   increasing a weight as a phase difference between a transmission phase of a shared channel mobile station and a transmission phase of a dedicated channel mobile station to which data is diversity-transmitted becomes smaller, and
   finding the weights for all the dedicated channel mobile stations to which data is diversity-transmitted based on the phase differences for each shared channel mobile station;
   computing a sum of the weight for each shared channel mobile station and
   regarding the sum of the weights as the degree of interference.

5. The scheduling method for a base station according to claim 1, wherein
   calculating the degree of interference includes:
   increasing a weight of transmission power as a phase difference between a transmission phase of a shared channel mobile station and a transmission phase of a dedicated channel mobile station to which data is diversity-transmitted becomes smaller, and
   computing a sum P of the transmission powers by the following expression for each shared channel mobile station, $$P = \sum_{i=1}^{N} P_i \times w_i$$

where $w_i$ is a weight of a dedicated channel mobile station to which data is diversity-transmitted, the weight being decided based on the phase difference, $P_i$ is a transmission power for the dedicated channel mobile station and N is the number of the dedicated channel mobile stations to which data is currently diversity-transmitted using the dedicated channel, and
   regarding the sum of the transmission powers as the degree of interference.

6. The scheduling method for a base station according to claim 2 or claim 3, wherein
   an amount of packets to be transmitted to the shared channel mobile station is taken into consideration when the degree of interference is calculated.

7. The scheduling method for a base station according to claim 2 or claim 3, wherein
   a time for holding packets to be transmitted to the shared channel mobile station is taken into consideration when the degree of interference is calculated.

8. A base station which transmits an identical packet or data to mobile stations via a plurality of transmission antennas based on a transmission diversity system, the base station comprising:
   a transmission phase difference monitoring unit which monitors a transmission phase (first transmission phase) for each mobile station, when a packet is diversity-transmitted to mobile stations using a shared channel, and monitors a transmission phase (second transmission phase) for each mobile station, when data is diversity-transmitted to other mobile stations using a dedicated channel; and a scheduler which calculates, by making use of the second transmission phases for each shared channel mobile station to which a pilot is diversity-transmitted using the shared channel, a degree of interference in all the dedicated channel mobile stations to which data is diversity-transmitted using the dedicated channel, the interference being generated when a packet is diversity-transmitted to the shared channel mobile station, and transmits a packet to a predetermined shared channel mobile station preferentially according to the degree of interference.

9. The base station according to claim 8, wherein the scheduler further comprises, a station number calculation unit which calculates, for each shared channel mobile station, the number of dedicated channel mobile stations to which data is diversity-transmitted in a same transmission phase as the transmission phase of the shared channel mobile station, and a control unit which regards the number of the dedicated channel mobile stations as the degree of interference, and controls so as to transmit preferentially a packet to a shared channel mobile station whose degree of interference is lowest.

10. The base station according to claim 8, wherein the base station further comprises a transmission power monitoring unit for monitoring transmission power for each dedicated channel mobile station to which data is diversity-transmitted, and the scheduler comprises:

a computing unit which finds, for each shared mobile station, dedicated channel mobile stations to which data is diversity-transmitted in a same transmission phase as the transmission phase of shared channel mobile station, and computes a sum of transmission powers for these dedicated channel mobile stations; and a control unit which regards the sum of the transmission powers as the degree of interference, and controls so as to transmit preferentially a packet to a shared channel mobile station whose degree of interference is lowest.

11. The base station according to claim 8, wherein the scheduler comprises:

a weight setting unit which increases a weight as a phase difference between a transmission phase of a shared channel mobile station and a transmission phase of a dedicated channel mobile station to which data is diversity-transmitted becomes smaller; and a control unit which calculates, for each shared channel mobile station, weights of dedicated channel mobile stations to which data is diversity-transmitted using the dedicated channel, based on the phase differences, regards the sum of the weights as the degree of interference, and controls so as to transmit preferentially a packet to a shared channel mobile station whose degree of interference is the lowest.

12. The base station according to claim 8, comprising a transmission power monitoring unit which monitors transmission power for a dedicated channel mobile station to which data is diversity-transmitted using the dedicated channel, wherein the scheduler comprises:

a weight setting unit which increases a weight of transmission power as a phase difference between a transmission phase of a shared channel mobile station and a transmission phase of a dedicated channel mobile station to which data is diversity-transmitted becomes smaller; and a control unit which computes a sum P of the transmission powers by the following expression for each shared channel mobile station, $$P = \sum_{i=1}^{N} P_i \times w_i$$

where $w_i$ is a weight of a dedicated channel mobile station to which data is diversity-transmitted, the weight being decided based on the phase difference, $P_i$ is a transmission power for the dedicated channel mobile station (and N is the number of the dedicated channel mobile stations to which data is diversity-transmitted using the dedicated channel, regards the sum of the transmission powers as the degree of interference, and controls so as to transmit preferentially a packet to a shared channel mobile station whose degree of interference is the lowest.

* * * * *